United States Patent
Plow et al.

(10) Patent No.: US 11,858,482 B2
(45) Date of Patent: Jan. 2, 2024

(54) PARKING BRAKE FOR AN ELECTRIC VEHICLE WITH MULTI-SPEED GEARBOX

(71) Applicant: Bendix Commercial Vehicle Systems, LLC, Avon, OH (US)

(72) Inventors: William Plow, Avon Lake, OH (US); Zsombor Gyoerke, Budakeszi (HU); Janos Toth, Kecskemét (HU); Sven Krueger, Munich (DE); Levente Hos, Budapest (HU); Michael Blessing, Munich (DE); Huba Nemeth, Budapest (HU); Peter Kovacsik, Goed (HU); Andreas Buch, Elyria, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 25 days.

(21) Appl. No.: 17/975,853

(22) Filed: Oct. 28, 2022

(65) Prior Publication Data

US 2023/0051924 A1    Feb. 16, 2023

Related U.S. Application Data

(60) Continuation of application No. 17/166,375, filed on Feb. 3, 2021, now Pat. No. 11,572,043, which is a
(Continued)

(51) Int. Cl.
*F16H 63/34*   (2006.01)
*B60T 7/08*    (2006.01)
(Continued)

(52) U.S. Cl.
CPC .............. *B60T 1/005* (2013.01); *B60K 17/08* (2013.01); *B60T 7/042* (2013.01); *B60T 7/085* (2013.01);
(Continued)

(58) Field of Classification Search
CPC ......... B60K 2001/006; F16H 63/34–36; B60T 7/045; B60T 7/085; B60T 7/042;
(Continued)

(56) References Cited

U.S. PATENT DOCUMENTS 4,709,793 A * 12/1987 Sakakibara ........... B60W 10/18
74/473.21
6,471,017 B1   10/2002 Booz et al.
(Continued)

FOREIGN PATENT DOCUMENTS

CN    202203357 U    4/2012
CN    109955718 A    7/2019
(Continued)

OTHER PUBLICATIONS

Cover sheet of EP 2104794 A1 issued Sep. 30, 2009 (one (1) page).
(Continued)

*Primary Examiner* — Jacob S. Scott
*Assistant Examiner* — Farhana Pervin
(74) *Attorney, Agent, or Firm* — Crowell & Moring LLP

(57) ABSTRACT

A commercial vehicle includes at least one driven axle, a service brake, at least one propulsion engine, and wheels. A parking brake function of the vehicle is achieved by a bistable locking means that acts on both wheels. A first and second multi-speed gearbox having respective first and second gear stages are each activated by an actuator and coupled to the wheels. The parking brake function is achieved at least in-part by concurrently activating the first and second gear stages. A computing device is configured to activate the bistable locking means when the commercial vehicle is at a standstill and configured to send a brake request via an electronic signal to an electronic brake control unit to activate the service brake.

14 Claims, 14 Drawing Sheets

Related U.S. Application Data division of application No. 16/893,082, filed on Jun. 4, 2020, now Pat. No. 11,440,513.

(51) Int. Cl.
| | |
|---|---|
| *B60T 1/00* | (2006.01) |
| *F16H 61/00* | (2006.01) |
| *F16D 11/14* | (2006.01) |
| *B60T 7/04* | (2006.01) |
| *F16H 3/08* | (2006.01) |
| *B60K 17/08* | (2006.01) |
| *B62D 63/04* | (2006.01) |
| *F16H 3/44* | (2006.01) |
| *F16D 11/00* | (2006.01) |
| *F16H 3/00* | (2006.01) |

(52) U.S. Cl.
CPC ............. *B62D 63/04* (2013.01); *F16D 11/14* (2013.01); *F16H 3/08* (2013.01); *F16H 3/44* (2013.01); *F16H 61/0059* (2013.01); *F16H 63/3416* (2013.01); *B60T 7/045* (2013.01); *F16D 2011/002* (2013.01); *F16H 3/00* (2013.01); *F16H 63/3491* (2013.01)

(58) Field of Classification Search
CPC .... B60T 2270/413; F16D 11/00–11/16; F16D 2023/0681; Y10T 74/1984
See application file for complete search history.

(56) References Cited

U.S. PATENT DOCUMENTS

| | | | |
|---|---|---|---|
| 8,343,001 B2 | 1/2013 | Anspann et al. | |
| 9,410,602 B2 | 8/2016 | Dewitz | |
| 9,657,828 B2 | 5/2017 | Larsson | |
| 9,821,779 B2* | 11/2017 | Grandstaff | ................ B60T 7/20 |
| 2002/0153221 A1 | 10/2002 | Schnepf | |
| 2002/0189383 A1 | 12/2002 | Schamscha | |
| 2005/0143220 A1 | 6/2005 | Berger et al. | |
| 2007/0157385 A1* | 7/2007 | Lemire | ............... A61M 5/1415 |
| | | | 5/618 |
| 2007/0227283 A1 | 10/2007 | Fujimoto et al. | |
| 2007/0289399 A1 | 12/2007 | Tanba et al. | |
| 2008/0035444 A1 | 2/2008 | Schiele et al. | |
| 2008/0283354 A1 | 11/2008 | Buannec et al. | |
| 2011/0168518 A1 | 7/2011 | Hilberer | |
| 2011/0303500 A1 | 12/2011 | Hilberer et al. | |
| 2013/0260961 A1* | 10/2013 | Dedo | .................. B60K 17/046 |
| | | | 477/77 |
| 2014/0213410 A1 | 7/2014 | Mori et al. | |
| 2018/0266493 A1 | 9/2018 | Dempfle | |
| 2018/0304869 A1* | 10/2018 | Hernandez | .............. B60T 7/042 |
| 2019/0293151 A1 | 9/2019 | Hayashi et al. | |
| 2019/0301577 A1 | 10/2019 | Harada | |
| 2019/0331200 A1* | 10/2019 | Barendrecht | ........ B60K 17/046 |
| 2019/0366822 A1* | 12/2019 | Yu | ........................... B60K 1/02 |
| 2020/0114889 A1* | 4/2020 | Egnor | ..................... B60T 11/20 |
| 2020/0116244 A1 | 4/2020 | Mittelberger et al. | |
| 2020/0124168 A1 | 4/2020 | Ohlig et al. | |
| 2020/0158218 A1* | 5/2020 | Himmelbauer | ...... B60K 17/046 |
| 2021/0239188 A1 | 8/2021 | Kontopoulos | |
| 2021/0261105 A1 | 8/2021 | Zhou | |
| 2021/0316705 A1* | 10/2021 | Laskawy | ................. B60T 7/042 |

FOREIGN PATENT DOCUMENTS

| | | | | |
|---|---|---|---|---|
| CN | 209795186 U | 12/2019 | | |
| CN | 209888557 U | 1/2020 | | |
| DE | 198 00 881 A1 | 4/1999 | | |
| DE | 10 2007 019 241 A1 | 10/2008 | | |
| DE | 10 2012 004 370 A1 | 9/2012 | | |
| DE | 10 2012 021 291 B4 | 5/2015 | | |
| DE | 10 2015 210 932 A1 | 12/2016 | | |
| DE | 10 2016 105 189 A1 | 9/2017 | | |
| DE | 10 2016 221 794 A1 | 5/2018 | | |
| DE | 10 2018 200 663 A1 | 7/2019 | | |
| EP | 1 226 376 B1 | 2/2004 | | |
| EP | 2 163 791 A1 | 3/2010 | | |
| EP | 2163791 A1 * | 3/2010 | ......... F16H 61/0059 | |
| EP | 3 467 353 A1 | 4/2019 | | |
| EP | 3 034 348 B1 | 6/2019 | | |
| JP | 4012759 B2 | 11/2007 | | |
| JP | 2014-144666 A | 8/2014 | | |
| JP | 2016-161065 A | 9/2016 | | |
| WO | WO 2006/027042 A1 | 3/2006 | | |
| WO | WO 2009/130553 A1 | 10/2009 | | |
| WO | WO 2014/026731 A1 | 2/2014 | | |
| WO | WO 2018/045027 A1 | 3/2018 | | |
| WO | WO 2019/068245 A1 | 9/2018 | | |
| WO | WO 2018/210380 A1 | 11/2018 | | |
| WO | WO 2019/025076 A1 | 2/2019 | | |
| WO | WO 2019/076644 A1 | 4/2019 | | |
| WO | WO 2019/228712 A1 | 12/2019 | | |
| WO | WO 2020/079070 A1 | 4/2020 | | |

OTHER PUBLICATIONS

Cover Sheet of EP 3507123 A1 issued Jul. 10, 2019 (one (1) page).
International Search Report (PCT/ISA/210) issued in PCT Application No. PCT/US2021/035438 dated Oct. 14, 2021 (five (5) pages).
Written Opinion (PCT/ISA/237) issued in PCT Application No. PCT/US2021/035438 dated Oct. 14, 2021 (five (5) pages).

* cited by examiner

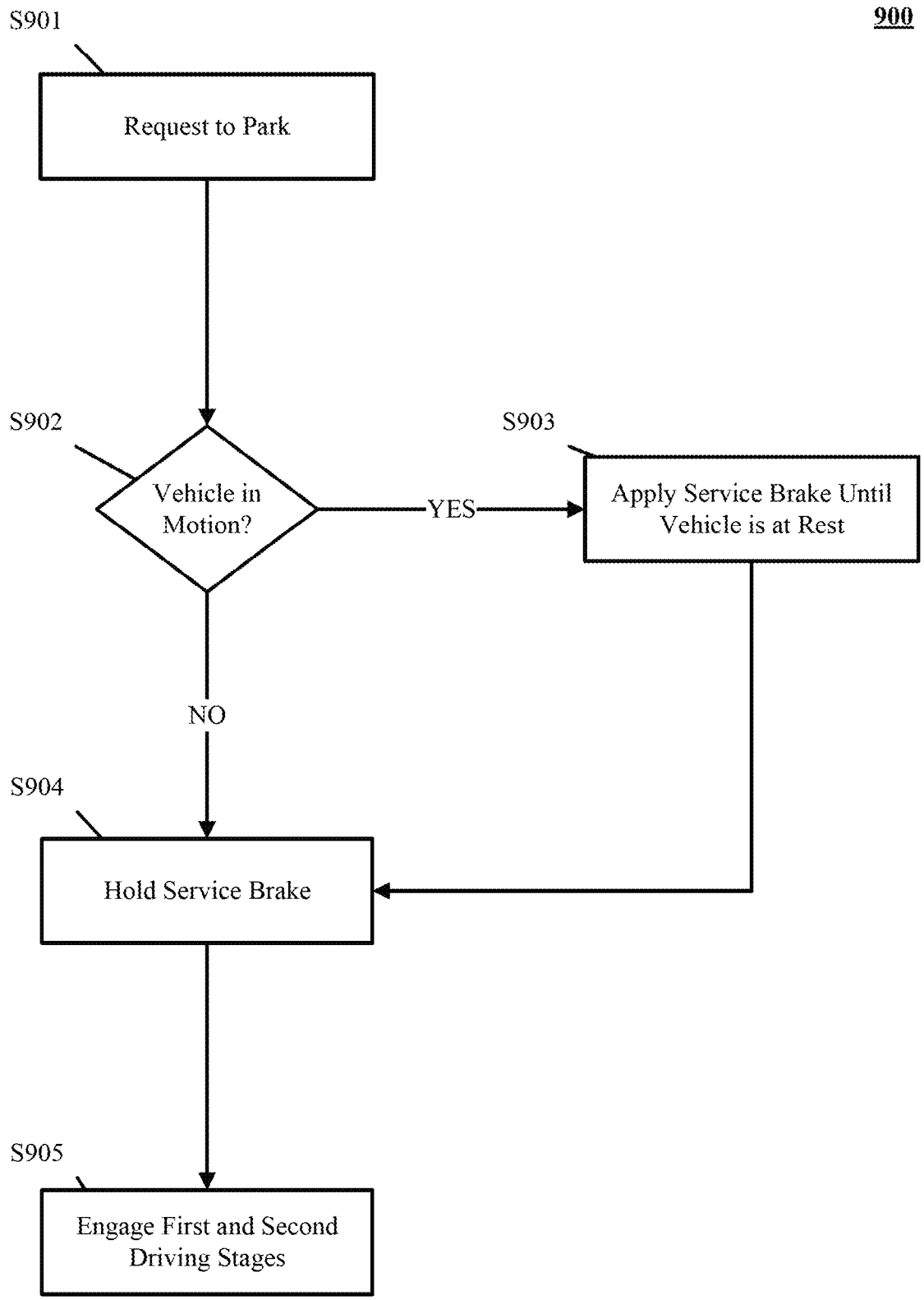

PARKING BRAKE FOR AN ELECTRIC VEHICLE WITH MULTI-SPEED GEARBOX

CROSS REFERENCE

This application is a continuation of U.S. patent application Ser. No. 17/166,375, filed Feb. 3, 2021, which is a divisional of U.S. patent application Ser. No. 16/893,082, filed Jun. 4, 2020, now U.S. Pat. No. 11,440,513 issued Sep. 13, 2022, the entire disclosures of which are herein expressly incorporated by reference.

BACKGROUND

Commercial vehicles may utilize a braking system where friction is applied to prevent one or more vehicle wheels from rotating. In some embodiments, the braking system may be implemented using a combination cylinder that includes both service brake and parking brake portions. The parking brake function may be realized using a spring brake placed axially behind the service brake portion in the combination cylinder housing, which may result in a relatively large assembly.

BRIEF SUMMARY

According to an embodiment of the disclosed subject matter, a vehicle drivetrain may be provided for achieving a bistable locking parking brake function. The vehicle drivetrain may include a first multi-speed gearbox having a plurality of driving stages and at least one actuator to activate a first driving stage of the plurality of driving stages. A first actuator of the at least one actuator may activate the first driving stage concurrently with a second driving stage. The vehicle drivetrain may further include a second actuator of the at least one actuator may active the second driving stage concurrently with the first driving stage activated by the first actuator. The vehicle drivetrain may further include a second multi-speed gearbox. The second multi-speed gearbox may include a plurality of driving stages and a third and fourth actuator to concurrently activate a first driving stage and a second driving stage of the plurality of driving stages. The vehicle drivetrain may further include an output shaft lock to mechanically couple an output of the first multi-speed gearbox with an output of the second multi-speed gearbox while the first driving stage and the second driving stage are concurrently activated. The activated second driving stage may be of the plurality of driving stages of the first multi-speed gearbox or of the plurality of driving stages of the second multi-speed gearbox. The vehicle drivetrain may further include an input shaft lock, when activated, to mechanically couple an input of the first multi-speed gearbox with an input of the second multi-speed gearbox. The vehicle drivetrain may further include an output shaft lock, when activated, to mechanically couple an output of the first multi-speed gearbox with an output of the second multi-speed gearbox. The first and second driving stages may have different ratios. The vehicle drivetrain may further include an auxiliary device to manually deactivate the first driving stage or the second driving stage, thereby releasing the parking brake function. The vehicle drivetrain may further include a first clutch of the first multi-speed gearbox to engage the first driving stage via the first actuator. The vehicle drivetrain may further include a second clutch of the first multi-speed gearbox to engage the second driving stage via a second actuator. The vehicle drivetrain may further include an elastic coupling mechanically linked to the second clutch. The elastic coupling may permit rotation of an input of the first multi-speed gearbox to align the first clutch with the first driving stage while the second clutch is engaged with the second driving stage.

A commercial vehicle may include at least one driven axle, at least one service brake, at least one propulsion engine and wheels characterized in that the parking brake function of the vehicle may be solved by a bistable locking means acting on both wheels. The commercial vehicle may further include a first multi-speed gearbox having a first gear stage activated by a first actuator and coupled to a first wheel of the wheels. The commercial vehicle may further include a second multi-speed gearbox having a second gear stage activated by a second actuator and coupled to a second wheel of the wheels. The parking brake function may be achieved by concurrently activating the first gear stage and the second gear stage. The commercial vehicle may further include an output shaft lock, when activated, to couple the first wheel of the pair of wheels to the second wheel of the pair of wheels. The commercial vehicle may further include an input shaft lock, when activated, to couple an input of the first multi-speed gearbox with an input of the second multi-speed gearbox. The first gear stage may be characterized by a first ratio that differs from a second ratio of the second gear stage. The commercial vehicle may further include an elastic coupler and a sliding clutch including a toothed selector ring coupled to the elastic coupler that allows for limited rotational movement of the toothed selector ring about a sliding axis of the sliding clutch. The sliding clutch may be actuated by the second actuator. The commercial vehicle may further include a multi-speed gearbox having a plurality of gear stages, an actuator, and a sliding clutch, when actuated by the actuator, to engage a first gear stage and a second gear stage concurrently. The first gear stage or second gear stage may include conjugated teeth. The teeth of the toothed selector ring are shaped to allow meshing with the conjugated teeth when in a tooth-to-tooth position. The commercial vehicle may further include an outer planetary gear disposed in an outer wheel rim of each wheel of the wheels of the driven axle. The ratio between a final stage shaft of a differential driving the pair of wheels and the driven wheel may be larger than one. The commercial vehicle may further include a computing device to activate the bistable locking means when the commercial vehicle is at a standstill. The commercial vehicle may further include an electronic brake control unit. The computing device may be configured to send a brake request via an electronic signal to a brake control unit to activate the bistable locking means. The commercial vehicle may further include a redundant foot brake module for redundant braking and a booster. The computing device may be configured to send a brake request to the booster via an electronic signal to activate the redundant foot brake module when the electronic brake control unit fails to execute the brake request.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification.

The drawings also illustrate embodiments of the disclosed subject matter and together with the detailed description serve to explain the principles of embodiments of the disclosed subject matter. Features from the illustrated embodiments may be combined together, appended, removed, and/or otherwise modified as desired without departing from the scope of the disclosed subject matter. No attempt is made to show structural details in more detail than may be necessary for a fundamental understanding of the disclosed subject matter and various ways in which it may be practiced.

FIG. 9 illustrates an example flow 900 for activating a parking brake function in accordance with an embodiment of the disclosed subject matter.

DETAILED DESCRIPTION

The present subject matter discloses a parking brake function that may be realized using one or more multi-speed gearboxes. The present subject may be especially advantageous in commercial trucks having electric or hybrid drivetrains, though it may be applicable to any vehicle having any type of drivetrain employing one or more multi-speed gearboxes. In some embodiments, the present subject matter may allow for the size and complexity of the vehicle braking system to be reduced particularly in proximity to the wheels and/or axles. This may reduce the overall vehicle weight and/or allow additional and/or alternate vehicle components, such as batteries, electric motors, and the like, to be installed in the vehicle.

Figure 1:
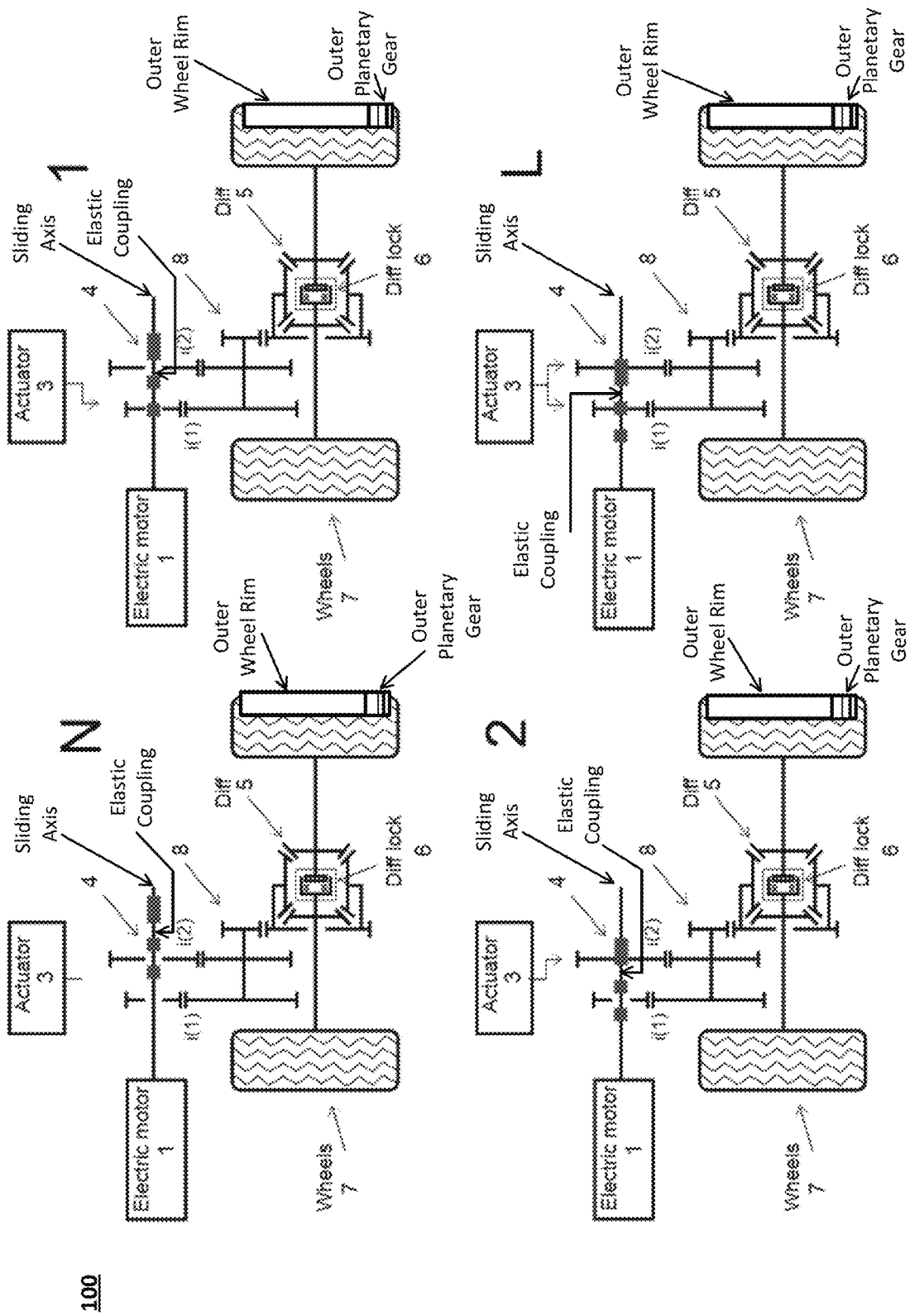
FIG. 1 illustrates an example drivetrain 100 in accordance with an embodiment of the disclosed subject matter.

FIG. 1 is a schematic of a drivetrain 100 according to an embodiment of the disclosed subject matter having an example differential 5. The drivetrain 100/150 may include a shift-able, multi-speed gearbox 8 having at least a first driving stage i(1) and a second driving stage i(2). The driving stages i(1)/i(2) may utilize different ratios for operating an electric motor 1 in the optimal performance range during various driving situations. Rotation from the electric motor 1 or other propulsion source may be input to the multi-speed gearbox 8 via an input shaft, chain, belt, gear, or the like, of the multi-speed gearbox 8. The ratios may be selected, for example, to fulfill a vehicle gradeability requirement from rest, such that the vehicle may be capable of starting on a specified grade and capable of maintaining forward motion on the same grade. While referred to as "gearbox," the driving stages i(1)/i(2) disposed within multi-speed gearbox 8 may be realized by gears, pulleys or sprockets, which are connected by belts and/or chains, or the like. A differential 5 may distribute the torque generated by the electric motor 1 to a wheel pair 7. Each wheel of wheel pair 7 may include an outer planetary gear disposed on the outer rim of each wheel, where a ratio between a final stage shaft of the differential 5 driving the wheel pair 7 and the driven wheels is larger than one. While an electric motor 1 is illustrated in FIG. 1 for the purpose of discussion, any type of engine, motor, or other source of propulsion may be used without departing from the scope of the disclosed subject matter. Where one or more electric motors may be utilized, the vehicle may include an appropriate charge storage device, such as a battery pack, capacitor, or the like, from which current may be principally drawn to deliver power. A gear actuator 3, which may be electrically, hydraulically, or pneumatically operated, may select a driving stage i(1)/i(2) of the multi-speed gearbox 8 using a sliding clutch 4. The gear actuator 3 may also select a neutral mode (N) of sliding clutch 4, which may render the output shaft of the electric motor 1 disconnected from the differential 5 and wheels 7. As used herein, the output shaft of the electric motor 1 may be mechanically coupled to the input of the multi-speed gearbox 8, and the conventions may be used interchangeably. For example, sliding clutch 4 may be said to couple the output of electric motor 1, or equivalently the input of the multi-speed gearbox 8, to the driving stages i(1)/i(2), differential 5, and wheels 7. As shown, when gear actuator 3 is moved to a first mode (1), the sliding clutch 4 may mechanically link the output shaft of the electric motor 1 to the differential 5 and wheels 7 via a first driving stage i(1). When gear actuator 3 is moved to a second mode (2), the sliding clutch 4 may mechanically link the output shaft of the electric motor 1 to the differential 5 and wheels 7 via a second driving stage i(2). A fourth locking mode (L) may mechanically link the electric motor 1 to the differential 5 and wheels 7 via both the first i(1) and second i(2) driving stages. As previously discussed, the at least first and second driving stages i(1)/i(2) may utilize differing ratios that cannot operate simultaneously without allowing at least one driving stage i(1)/i(2) to slip. Accordingly, the fourth locking mode (L) may lock the multi-speed gearbox 8 such that it prevents rotation both of its output shaft and the mechanically-coupled output shaft of the electric motor 1.

With the locking mode (L) engaged, the input gear-wheel of the differential, also known as the pinion gear, may be locked as well as the ring gear. Each wheel of wheel pair 7 may be able to independently rotate freely in opposite directions, while each wheel may be prohibited from simultaneously rotating in the same direction. To ensure the vehicle is prevented from rolling, a differential lock 6 may be utilized. A differential lock 6 may be activated to mechanically link the first wheel with the second wheel, thereby preventing the independent rotation in opposite directions. The differential lock 6 may be realized by coupling each output shaft of the differential 5. With the wheel pair 7 locked, a parking brake mode may be achieved that may prevent the vehicle from rolling forward and/or backward. Differential lock 6 may be activated to mechanically link the wheels 7 subsequently in response to or simultaneously with the selection of the fourth locking mode (L) via gear actuator 3. Alternatively or in addition, the differential lock 6 may be activated independently of whether the fourth locking mode (L) is activated for the purpose of improving wheel traction, for example. Activation of the fourth locking mode (L) by gear actuator 3 shall be prohibited while the vehicle is moving, via mechanical and/or electrical techniques, to avoid causing damage to the first and second driving stages i(1)/i(2).

The multi-speed gearbox 8 may be unsynchronized. In order to transition between the driving stages i(1)/i(2), a variety of techniques may be employed. For example, while the vehicle is moving, a transition from a first driving stage i(1) to i(2) may occur by disengaging the first driving stage i(1) such that electric motor 1 is in a neutral mode. Subsequently, the speed of the output shaft of the electric motor 1 and the coupled input of the multi-speed gearbox 8 may be adjusted so that the sliding clutch 4 can engage with the driving stage i(2) smoothly and without causing excessive wear or damage. In contrast, when the vehicle is at a standstill, the electric motor 1 may rotate the input of the multi-speed gearbox 8 to a position where the sliding clutch 4 may engage with the second driving stage i(2). If the input of the multi-speed gearbox 8 is not aligned such that the sliding clutch 4 can engage with the second driving stage i(2), the input of the multi-speed gearbox 8 may be additionally rotated via the electric motor 1, which may correspondingly rotate the vehicle wheels 7, until the correct engagement position for the second driving stage i(2) is reached. Rotating the wheels 7 may displace the vehicle by a short distance, such as between 5 and 25 mm; preferably, 14 mm or less. A gear actuator 3, which may also be used to activate clutch 4 to engage the first or second driving stage i(1)/i(2), may also be used to disengage the clutch 4 from the first driving stage i(1)/i(2).

The multi-speed gearbox 8 may be unsynchronized such that a connected electric motor may adjust its speed appropriately to allow for a smooth transition of the sliding clutch 4 based on the selected driving stage i(1)/i(2) and current vehicle speed. A smooth transition from one driving stage to another may be one that is designed to minimize wear on the internal multi-speed gearbox 8 components while also providing a comfortable experience for passengers of the vehicle that is relatively free of rapid accelerations and decelerations.

Figure 2A:
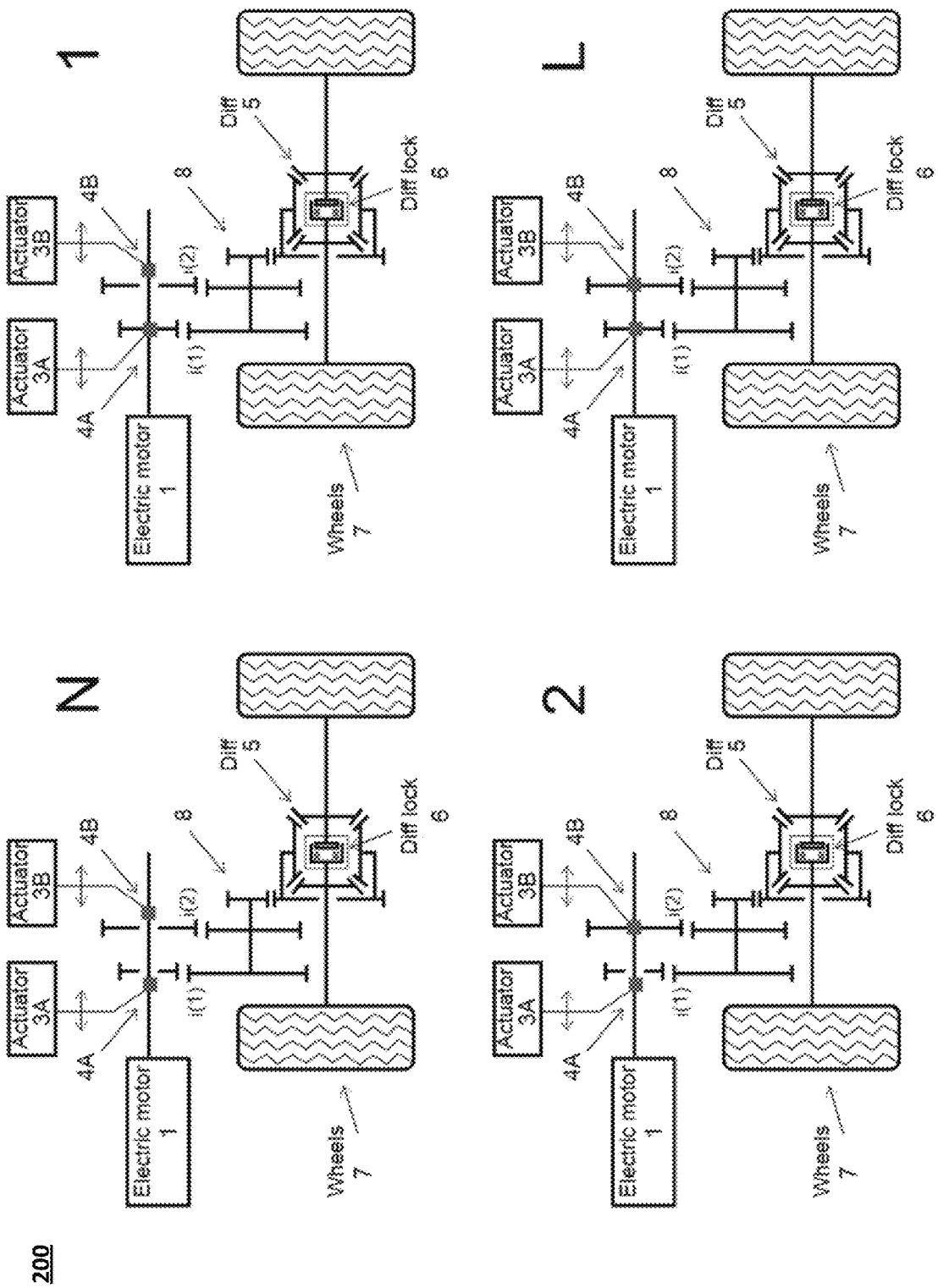
FIG. 2A illustrates an example drivetrain 200 in accordance with an embodiment of the disclosed subject matter.

FIG. 2A is a schematic of a drivetrain 200 according to an embodiment of the disclosed subject matter having an example differential 5. Drivetrain 200/250 may be similar to drivetrain 100/150 but may include two gear actuators 3A/3B that are individually operable via a respective sliding clutch 4A/4B. As shown in FIG. 2, a neutral mode (N) may be selected where neither gear actuator 3A nor 3B is activated to engage its respective sliding clutch 4A/4B. When gear actuator 3A is activated in a first mode (1), the corresponding sliding clutch 4A may link the output shaft of electric motor 1 to the differential 5 and wheels 7 via a first driving stage i(1). When gear actuator 3B is activated and gear actuator 3A is not activated in a second mode (2), the corresponding sliding clutch 4B may be engaged to link the output shaft of electric motor 1 to the differential 5 and wheels 7 via a second driving stage i(2). A fourth locking mode (L) may occur where both gear actuator 3A and gear actuator 3B are activated to engage sliding clutches 4A and 4B to mechanically link the output shaft of the electric motor 1 with both driving stages i(1)/i(2). Because the first and second driving stages may utilize differing ratios that cannot operate concurrently, the fourth locking mode (L) may lock the drivetrain 200/250 to prevent the vehicle wheels 7 from rolling, thereby achieving a parking brake function when the differential lock is activated.

As previously discussed with respect to FIG. 1, with the locking mode (L) engaged, the input gear-wheel of the differential may be locked. Each wheel of wheel pair 7 may be able to independently rotate freely in opposite directions, while each wheel may be prohibited from simultaneously rotating in the same direction. To ensure the vehicle is prevented from rolling, a differential lock 6 may be utilized. A differential lock 6 may be activated to mechanically link the first wheel with the second wheel, thereby preventing the independent rotation in opposite directions. The differential lock 6 may be realized by coupling each output shaft of the differential 5. With the wheel pair 7 now locked, parking brake function may be achieved. Differential lock 6 may be activated to mechanically link the wheels 7 subsequently in response to, or simultaneously with the selection of the fourth locking mode (L) via gear actuator 3. Alternatively or in addition, the differential lock 6 may be activated independently of whether the fourth locking mode (L) is activated. This may be performed for the purpose of improving wheel traction, for example. Activation of the fourth locking mode (L) by gear actuator 3 may be prohibited while the vehicle is in motion via mechanical and/or electrical techniques to avoid causing damage to the first and second driving stages i(1)/i(2).

Figure 2B:
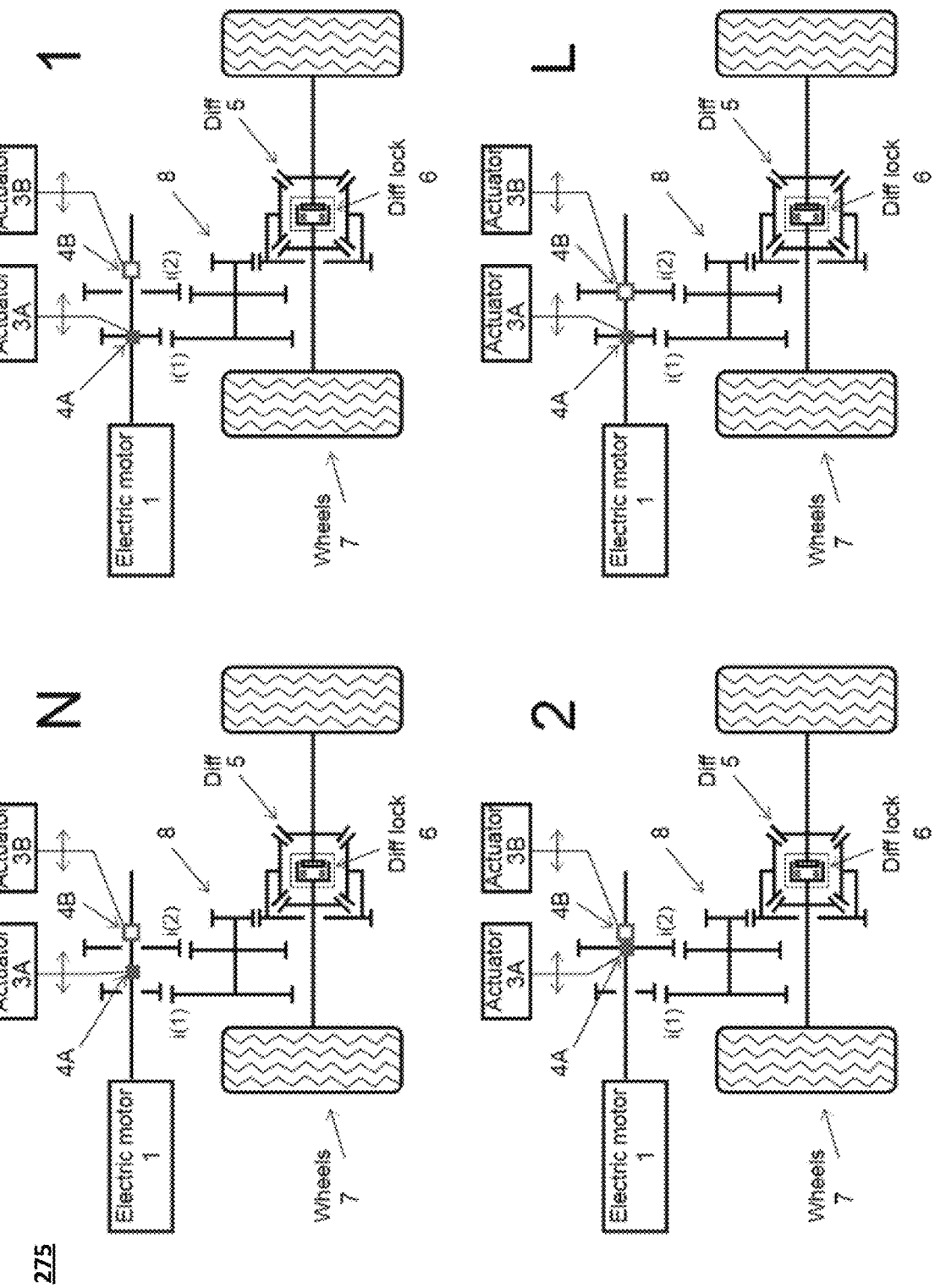
FIG. 2B illustrates an example drivetrain 275 in accordance with an embodiment of the disclosed subject matter.

FIG. 2B is a schematic of a drivetrain 275 according to an embodiment of the disclosed subject matter that is similar to drivetrain 200 as depicted in FIG. 2A. In drivetrain 275, sliding clutch 4B may be mechanically linked to an elastic coupling and may be only activated via gear actuator 3B during a parking brake mode (L). As in drivetrain 200, gear actuators 3A/3B may be individually operable via the respective sliding clutches 4A/4B. In contrast to drivetrain 200, sliding clutch 4A may be used during driving modes to engage both the first driving stage i(1) and the second driving stage i(2); i.e., the first (1) and second (2) modes. Sliding clutch 4B may only be used during the parking brake mode (L) and may remain in a neutral mode (N) at all other times. Therefore, the elastic coupling of sliding clutch 4B may not be used while the vehicle is moving. As in drivetrain 200, the first i(1) and second i(2) driving stages may utilize differing ratios that cannot operate concurrently. Thus, the fourth locking mode (L) may lock the drivetrain 275 to prevent the vehicle wheels 7 from rolling, thereby achieving a parking brake function.

As previously discussed with respect to FIG. 1, with the locking mode (L) engaged, the input gear-wheel of the differential may be locked. Each wheel of wheel pair 7 may be able to independently rotate freely in opposite directions, while each wheel may be prohibited from simultaneously rotating in the same direction. To ensure the vehicle is prevented from rolling, a differential lock 6 may be utilized. A differential lock 6 may be activated to mechanically link the first wheel with the second wheel, thereby preventing the independent rotation in opposite directions. The differential lock 6 may be realized by coupling each output shaft of the differential 5. Differential lock 6 may be activated to mechanically link the wheels 7 subsequently in response to, or simultaneously with the selection of the fourth locking mode (L) via gear actuator 3. Alternatively or in addition, the differential lock 6 may be activated independently of whether the fourth locking mode (L) is activated. This may be performed for the purpose of improving wheel traction, for example. Activation of the fourth locking mode (L) by gear actuator 3 may be prohibited while the vehicle is in motion via mechanical and/or electrical techniques to avoid causing damage to the first and second driving stages i(1)/i(2).

The elastic coupling, which is mechanically linked with sliding clutch 4B, may improve the parking process and facilitate engagement of the parking brake function. When attempting to park the vehicle, the vehicle may then be maneuvered into the desired parking location. At this point, the driver may wish to activate the parking brake function. For maneuvering, stage i(1) is activated and stays activated. Parking mode is initiated by activating stage i(2) with sliding clutch 4B. To avoid driving the electric motor in case of an unaligned clutch 4B and gear wheel of stage i(2), the elastic coupling of the clutch and the chamfer or tooth-on-tooth engagement of the second driving stage i(2) is used. The elastic coupler will rotate under the same force as the actuator force when the clutch 4B is engaged.

In another example, sliding clutch 4B may be engaged via gear actuator 3B to activate the second driving stage i(2). When stopped, the engagement of sliding clutch 4B with the second driving stage i(2) may occur only when the hub of the second driving stage i(2) is correctly aligned with sliding clutch 4B. For example, sliding clutch 4B may include dog teeth, a toothed selector ring, or the like, that may be aligned with a corresponding toothed portion of the driving stage i(2). The driving stages i(1)/i(2) may include conjugated teeth that are shaped to mesh with the teeth of the toothed selector ring of clutch 4A/4B when in a tooth-to-tooth position. Electric motor 1 may rotate the input of multi-speed gearbox 8 to align the teeth of sliding clutch 4B with the second driving stage i(2). To achieve the parking brake function, driving stage i(1) may be concurrently engaged via sliding clutch 4A. Sliding clutch 4A may also require alignment with the hub of driving stage i(1), which can be accomplished by rotating the input of multi-speed gearbox using electric motor 1 as previously described. Normally, rotating the electric motor 1 at this point to align clutch 4A with driving stage i(1) would displace the vehicle, since driving stage i(2) is already engaged. Because clutch 4B is mechanically linked to the elastic coupling however, limited rotation of the input may be permitted without displacing the vehicle. Stated another way, the elastic coupling of sliding clutch 4B allows the input of multi-speed gearbox 8 to twist in-place without translating the twisting to rotation of the wheel pair 7 via the second driving stage i(2), as may be the case when an elastic coupling is not used. In this way, alignment of the first driving stage i(1) hub may be achieved with clutch 4A while the second driving stage i(2) is engaged without displacing the vehicle.

Figure 3:
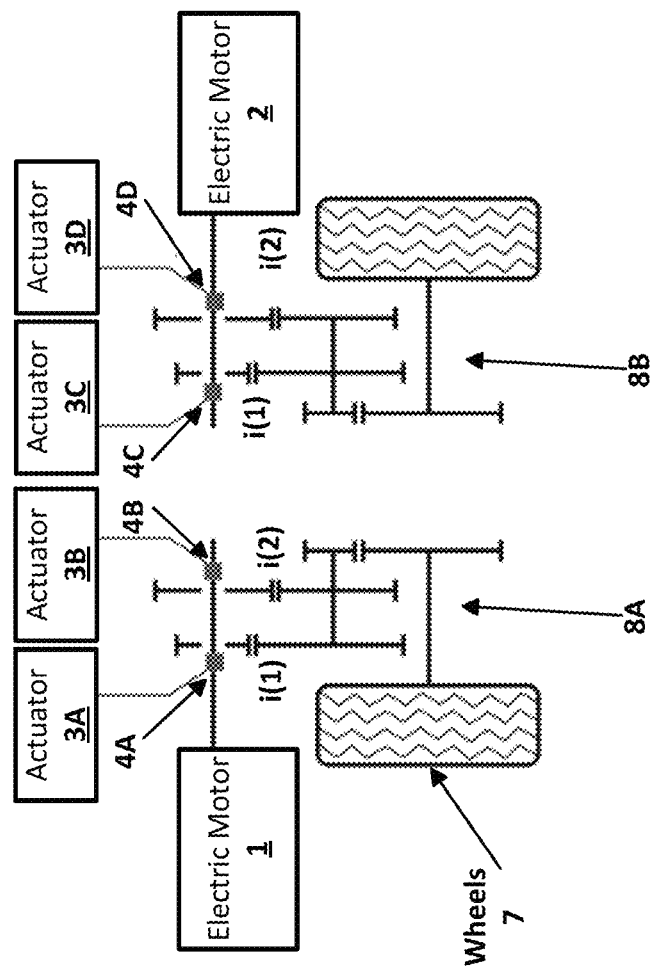
FIG. 3 illustrates an example drivetrain 300 in accordance with an embodiment of the disclosed subject matter.

FIG. 3 is a schematic of a drivetrain 300 that may include a pair of electric motors 1/2 and corresponding pair of multi-speed gearboxes 8A/8B according to an embodiment of the disclosed subject matter. Each of the first electric motor 1 and the second electric motor 2 may individually drive a respective wheel of the wheel pair 7 via a respective first and second multi-speed gearbox 8A/8B. In this way, and as applicable to FIGS. 4-7, the vehicle may realize the associated improvements in efficiency, due to no losses through the differential, safety, due to the second motor being available in case of loss of the first motor, and dynamics, due to torque vectoring. Additionally, each wheel of wheel pair 7 may realize individualized braking and individualized recuperation to recharge an associated charge storage device of the vehicle. Rotation from the electric motor 1 or other propulsion source may be input to the multi-speed gearboxes 8A/8B via an input shaft, chain, belt, gear, or the like, of the multi-speed gearbox 8A/8B. Each multi-speed gearboxes 8A/8B may have two or more driving stages i(1)/i(2) that may be individually engaged via a corresponding sliding clutch 4A-4D by activating a corresponding gear actuator 3A-3D. In this way, each multi-speed gearbox 8A/8B may provide at least a neutral, first, and second driving mode as previously discussed. In an embodiment, gear actuators 3A/3C and 3B/3D may be activated and deactivated in pairs simultaneously, so as to maintain a same driving stage i(1)/i(2) for each of the wheels 7. For example, the actuation of the i(1) driving stage may occur simultaneously for gear actuators 3A and 3C and sliding clutches 4A and 4C, while actuation of the i(2) driving stage may occur simultaneously for gear actuators 3B and 3D and sliding clutches 4B and 4D. Activating gear actuators 3A-3D together may each input of the multi-speed gearboxes 8A/8B corresponding wheels of the wheel pair 7. With the wheel pair 7 locked, a parking brake mode may be achieved. Since each wheel of the wheel pair 7 may be driven independently, no differential may be necessary to distribute torque to the wheels 7. Likewise, and in contrast to the drivetrain layouts 100 and 200, no differential lock may be necessary in order to lock the wheels 7 in drivetrain layout 300.

Figure 4:
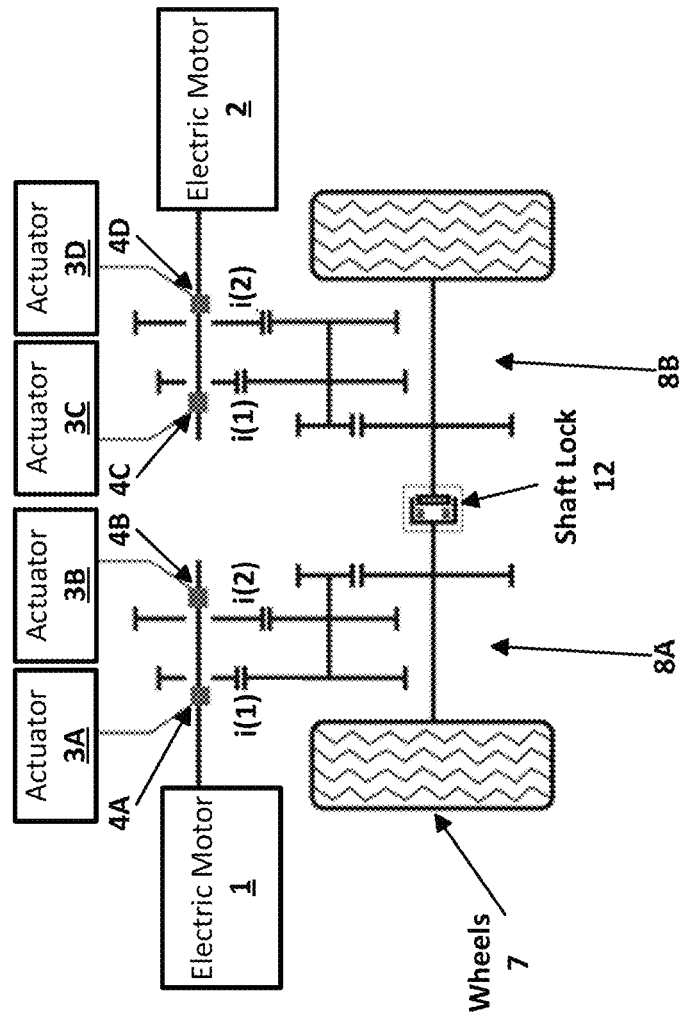
FIG. 4 illustrates an example drivetrain 400 in accordance with an embodiment of the disclosed subject matter.

FIG. 4 is a schematic of a drivetrain 400 similar to drivetrain 300 that may additionally include shaft lock 12 according to an embodiment of the disclosed subject matter. Shaft lock 12 may be activated to mechanically couple each wheel of the wheel pair 7. Unlike drivetrain 300, if shaft lock 12 is activated, activating either of gear actuators 3A and 3B or gear actuators 3C and 3D may lock both wheels of wheel pair 7. Stated another way, shaft lock 12 may allow for locking both wheels of the wheel pair 7 by locking only a single multi-speed gearbox of the multi-speed gearboxes 8A/8B. With the wheel pair 7 locked via shaft lock 12, the parking brake mode may be achieved. As previously discussed, one or more multi-speed gearboxes 8A/8B may be locked in a fourth locking mode (L) where at least two driving stages i(1)/i(2) are engaged concurrently.

Figure 5:
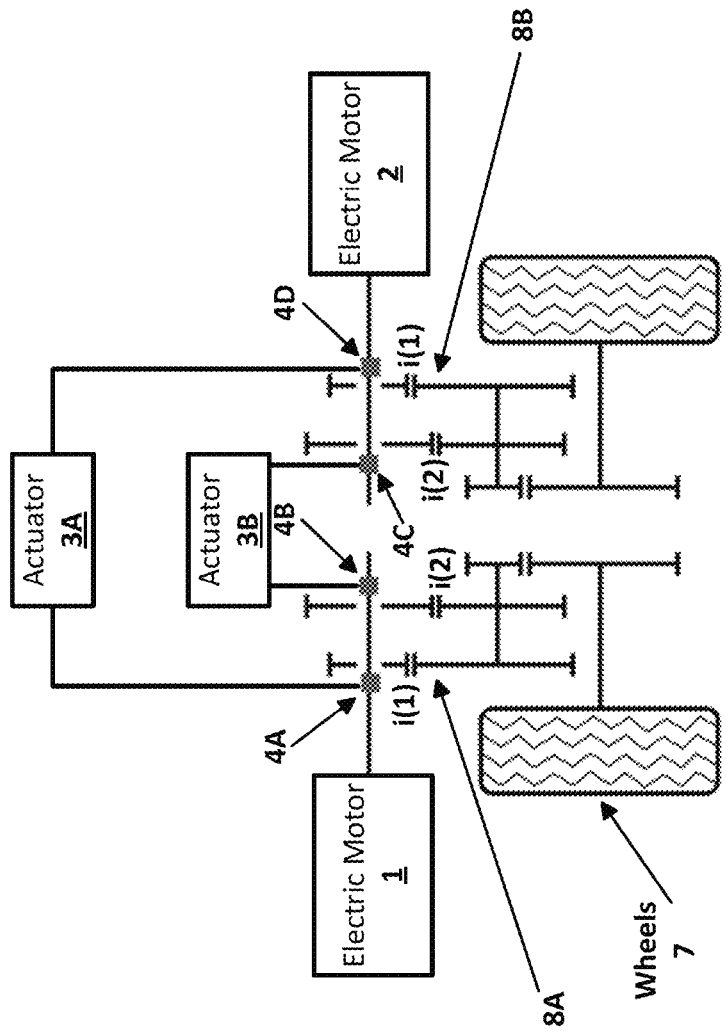
FIG. 5 illustrates an example drivetrain 500 in accordance with an embodiment of the disclosed subject matter.

FIG. 5 is a schematic of a drivetrain 500 where common gear actuators 3A and 3B are shared between the sliding clutches 4A-4D according to an embodiment of the disclosed subject matter. More specifically, gear actuator 3A may be used to engage sliding clutches 4A and 4D that may mechanically link to a first driving stage i(1). Gear actuator 3B may be correspondingly used to engage sliding clutches 4B and 4C, which may mechanically link to a second driving stage i(2). With both gear actuators 3A and 3B activated to engage all four clutches 4A-4D, the wheel pair 7 may be locked, thereby achieving the parking brake mode. By reducing the number of gear actuators 3 used to implement the drivetrain 500 when compared to drivetrain 400, a cost savings may be realized. Additionally, because drivetrain 500 may operate the sliding clutches 4A/4D and 4B/4C in unison, a different lock 6 may be unnecessary in order to lock both wheels of wheel pair 7 since both the first multi-speed gearbox 8A may be locked concurrently with the second multi-speed gearbox 8B.

Figure 6:
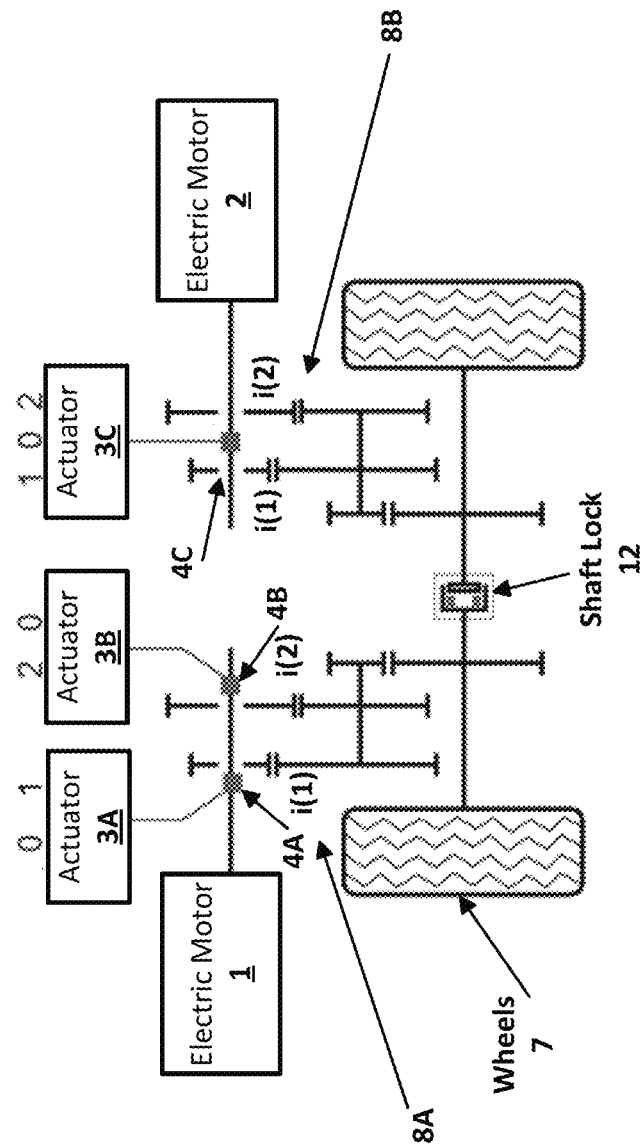
FIG. 6 illustrates an example drivetrain 600 in accordance with an embodiment of the disclosed subject matter.

FIG. 6 is a schematic of a drivetrain 600 according to an embodiment of the disclosed subject matter. As shown in FIG. 6, gear actuators 3A and 3B may be provided for mechanically linking the output shaft of electric motor 1 with multi-speed gearbox 8A via first and second sliding clutches 4A and 4B. Gear actuator 3A may be deactivated in a neutral mode or activated to engage sliding clutch 4A with at least a first driving stage i(1), while gear actuator 3B may be deactivated in a neutral mode or activated to engage sliding clutch 4B with a second driving stage i(2). Using gear actuator 3A to engage clutch 4A in the first driving stage i(1) while simultaneously using gear actuator 3B to engage clutch 4B in the second driving stage i(2) may achieve the parking brake mode for a first wheel of the wheel pair 7. Gear actuator 3C, on the other hand, may be deactivated in a neutral mode or activated to engage either at least a first driving stage i(1) or a second driving stage i(2) of multi-speed gearbox 8B via sliding clutch 4C. Because sliding clutch 4C may be incapable of engaging both driving stages i(1)/i(2) simultaneously to establish a fourth locking mode, shaft lock 12 may be utilized to lock the second wheel when the first wheel is locked via the engagement of sliding clutches 4A and 4B. Stated another way, the shaft lock 12, when activated, may lock the second wheel (corresponding to electric motor 2) to the locked first wheel (corresponding to electric motor 1).

In the event of a failure of one of the electric motors 1/2 or associated electronics, such as an inverter, power supply line, or the like, the remaining electric motor 1/2 and corresponding multi-speed gearbox 8A/8B may be utilized to transfer power to both wheels of wheel pair 7 by activating shaft lock 12. For example, if electric motor 1 fails, electric motor 2 may provide power to both wheels of wheel pair 7 by engaging shaft lock 12. Following the same example, even where electric motor 1 fails, the vehicle may still achieve a parking brake mode by activating shaft lock 12 in conjunction with engaging both clutches 4A and 4B or, by engaging clutch 4C with a first driving stage i(1)/i(2) while concurrently engaging either clutch 4A or 4B corresponding to the second, different driving stage i(1)/i(2).

Figure 7:
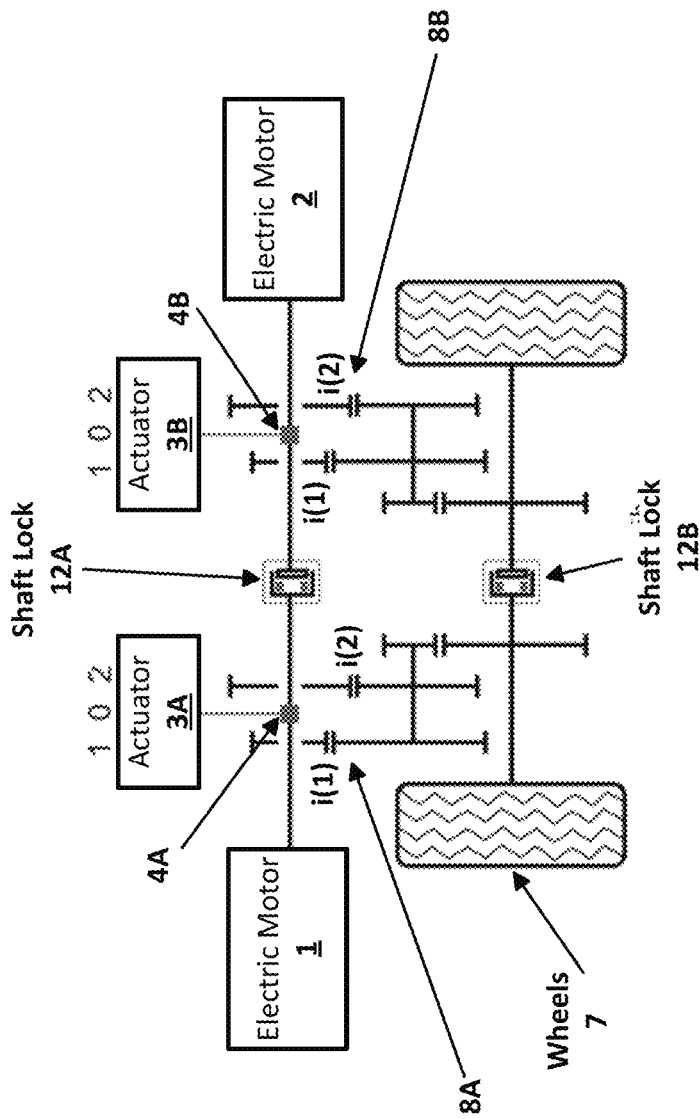
FIG. 7 illustrates an example drivetrain 700 in accordance with an embodiment of the disclosed subject matter.

FIG. 7 is a schematic of a drivetrain 700 having a first and second shaft lock 12A/12B according to an embodiment of the disclosed subject matter. The shaft locks 12A/12B may each be operated by one or more gear actuators or by the same gear actuator. Drivetrain 700 includes a first gear actuator 3A and a second gear actuator 3B that may function similarly to gear actuator 3C of drivetrain 600 having at least three driving modes. Specifically, each of gear actuators 3A and 3B may be deactivated in a neutral mode or activated to engage a respective sliding clutch 4A/4B with either a first driving stage i(1) or a second driving stage i(2) of a respective multi-speed gearbox 8A/8B. In general, gear actuators 3A and 3B may be synchronized to engage the first driving stage i(1) or the second driving stage i(2) simultaneously or otherwise during the same time period, as previously discussed with reference to drivetrain 400. Where driving conditions differ for each wheel of the wheel pair 7, for example, such as in ice or snow, or while traveling off-road, it may be possible to drive the first wheel using electric motor 1 at a first speed using the first driving stage i(1) and to simultaneously drive the second wheel using electric motor 2 at a second speed using the second driving stage i(2). Like gear actuator 3C of drivetrain 600, neither of the gear actuators 3A/3B may individually engage both the first and second driving modes i(1)/i(2) simultaneously, which may prevent either gear actuator 3A/3B from individually establishing a fourth locking mode. To achieve the parking brake mode in drivetrain 700 then, gear actuators 3A and 3B may each select different driving stages i(1)/i(2) via sliding clutches 4A and 4B. For example, gear actuator 3A may select driving stage i(2) while gear actuator 3B may select driving stage i(1). A shaft lock 12B may be disposed there between to mechanically couple the first and second wheels of wheel pair 7. Shaft lock 12B alone may be insufficient to realize the parking brake, however, since for example, the vehicle wheels 7 may still be capable of rolling, though the corresponding electric motors may independently rotate at differing speeds as a result of the disparate driving stages engaged. Accordingly, a shaft lock 12A may be provided to couple the output shafts of the electric motors, or equivalently the inputs of multi-speed gearboxes 8A/8B, thereby inhibiting the independent rotation. When activated during the same time, shaft locks 12A and 12B may achieve the parking brake function that locks drivetrain 700.

In the event of a failure of one of the electric motors 1/2 or one of the multi-speed gearboxes 8A/8B, the remaining electric motor 1/2 and corresponding multi-speed gearbox 8A/8B may be utilized to transfer power to both wheels of wheel pair 7 by activating shaft lock 12B. For example, if electric motor 1 fails, electric motor 2 may provide power to both wheels of wheel pair 7 via engagement of shaft lock 12B while shaft lock 12A and clutch 4A remain disengaged to eliminate and/or reduce any possible drag from the failed electric motor 1. Alternatively, or in addition, should a problem arise within multi-speed gearbox 8A, for example, shaft lock 12B may be utilized in combination with shaft lock 12A to transfer the cumulative power from both electric motors 1/2 via sliding clutch 4B and multi-speed gearbox 8B to the wheel pair 7. In this case, sliding clutch 4A may remain disengaged in the neutral mode so as to isolate the failed multi-speed gearbox 8A from the remainder of the drivetrain.

For each of the drivetrains shown in FIGS. 1-8, engagement of the at least two driving stages i(1)/i(2) to achieve the parking brake mode may be designed such that the parking brake functionality remains even when power is removed from the vehicle. This may be implemented using self-locking or otherwise latching actuators 3, a spring within the gear actuator 3 or sliding clutch 4, or the like. Because the gear actuator(s) 3 may be activated and deactivated via electrical or electronic techniques, an unlocking mechanism may be provided for manually disengaging the parking brake mode when vehicle power is unavailable and/or available. The unlocking mechanism may be an auxiliary device 9 implemented in the form of a spindle, thread-type device, and may be electrical or electronic in-part for use when vehicle power is available. Alternatively, or in addition, auxiliary device 9 may be an electrical or electronic release device that operates via externally-provided power that does not originate from the vehicle, such as from a battery of the auxiliary device 9, household mains electric power, another vehicle, or other power source. Alternatively, or in addition, the auxiliary device 9 may be fitted within the passenger compartment of the vehicle and may be electrically coupled with the multi-speed gearbox 8.

Figure 8A:
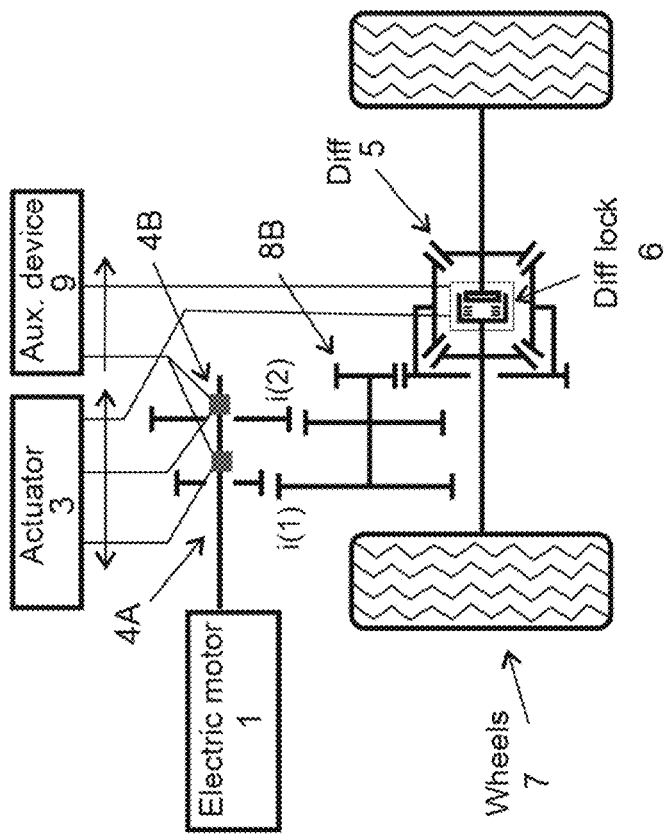
FIGS. 8A and 8B illustrate example drivetrains 800 and 825 in accordance with embodiments of the disclosed subject matter.

FIG. 8A is a schematic of a drivetrain 800 employing a first embodiment of an auxiliary device 9 and having an example differential 5. The auxiliary device 9 may employ an unlocking mechanism that enables manual release of the parking brake. The unlocking mechanism may be implemented using a spindle, thread-type device, electrical device, or the like, for example, to enable release of the parking brake mode. As shown in FIG. 8A, the auxiliary device 9 may be implemented by allowing for manual disengagement of sliding clutches 4A and 4B.

Figure 8B:
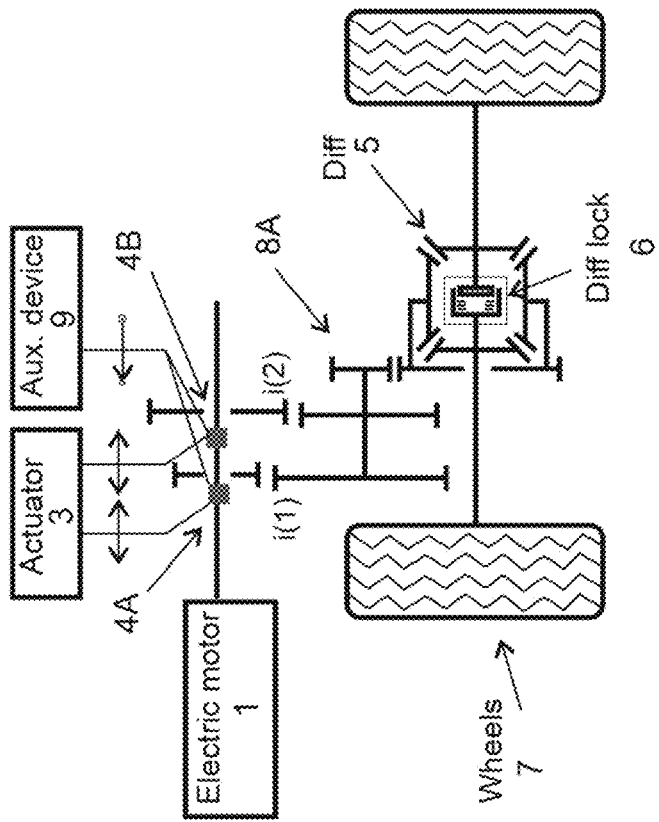

FIG. 8B is a schematic of a drivetrain 825 employing a second embodiment of an auxiliary device 9 and having an example differential 5. The embodiment shown in FIG. 8B may be integrated with or otherwise combined with the embodiment shown in FIG. 8A, although for purposes of simplifying the discussion and the illustrations, the embodiments are shown separately. As shown in FIG. 8B, the auxiliary device 9 may employ a manual unlocking mechanism to enable release of the parking brake by disengaging sliding clutches 4A and 4B. Additionally, where gear actuator 3 also activates and deactivates differential lock 6 of the differential 5, auxiliary device 9 may also manually unlock the differential lock 6.

FIG. 9 shows an example flow 900 for parking a vehicle according to an embodiment of the disclosed subject matter. A request may be received in S901 from a user to park a vehicle having at least one multi-speed gearbox. The parking request may be received via an input disposed within the vehicle itself or may be received remotely via an electronic device, such as a key fob or cellular phone, and may be received via the Internet, WiFi, Bluetooth, RFID, or other transmission medium. The vehicle may employ any of the example drivetrain layouts shown in FIGS. 1-8 or may employ an alternative drivetrain layout. In S902, it may be determined whether the vehicle is currently in motion. If the vehicle is in motion, the service brake may be applied to bring the vehicle to rest. The force with which the service brake is applied may be configurable and/or may vary based on the vehicle's current speed. The service brake may be applied by a processor of the vehicle, by the user, or both. Once the vehicle is at rest, the service brake may be held in S904, either by a processor of the vehicle itself, by the user, or both. At least two driving stages may be concurrently engaged in S905 to achieve the parking brake function. The driving stages may be, for example, a first driving stage and second driving stage implemented using gears or the like, as previously discussed. The first and second driving stages may be engaged within a single or multiple multi-speed gearbox(es). For example, the first driving stage may be engaged within a first multi-speed gearbox while the second driving stage may be engaged within the second multi-speed gearbox. The engagement of the first and second driving stages in S905 may or may not occur simultaneously. For example, the second driving stage may be engaged first, followed by the engagement of the first driving stage such that the first and second driving stages are concurrently engaged.

The engagement of the first and/or second driving stages may occur after rotation of the input shaft of the first and/or second multi-speed gearbox in order to correctly align the hub of the driving stage (e.g., $i(1)/i(2)$) with the sliding clutch 4. Rotation of the input shaft of the multi-speed gearbox(es) may involve displacing the vehicle forward and/or reverse by a relatively small distance, such as between 5 and 25 mm; preferably, 14 mm or less.

Other drivetrain variants include a single speed gearbox placed between one or more electric motors 1/2 and the multi-speed gearbox 8.

Figure 10:
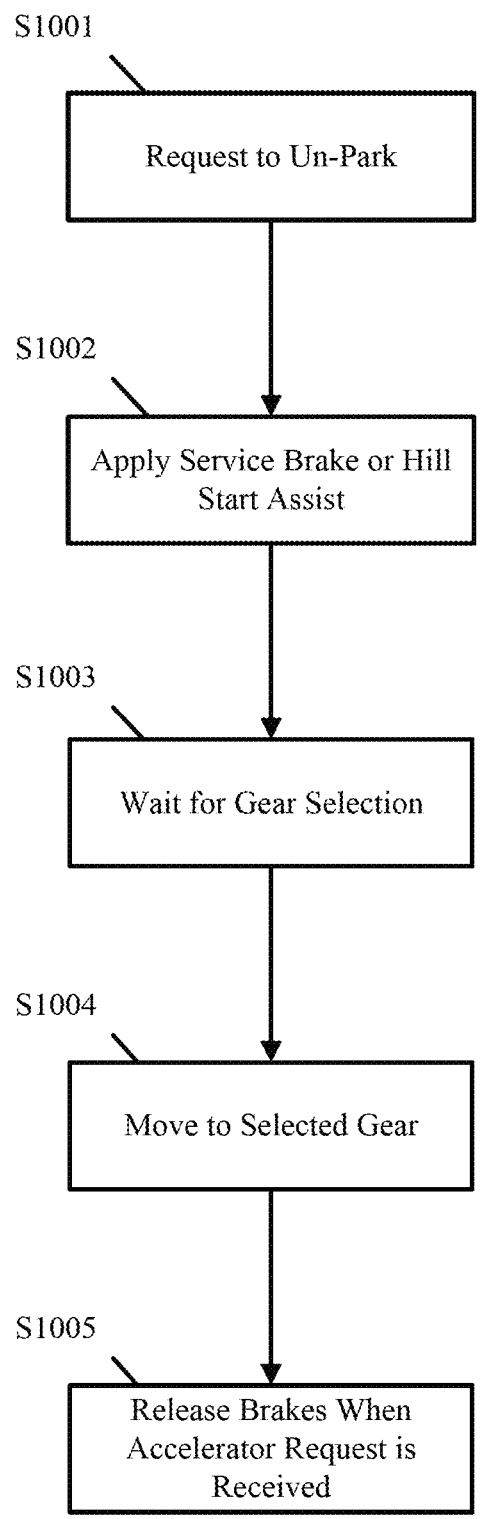
FIG. 10 illustrates an example flow 1000 for activating a parking brake function in accordance with an embodiment of the disclosed subject matter.

FIG. 10 shows an example flow 1000 for releasing a parking brake function. In S1001, a request to un-park a vehicle having a multi-speed gearbox 8 may be received from a user. The request may be received via an input disposed within the vehicle itself or may be received remotely via a secure electronic device, such as a key fob or cellular phone, and may be received via the Internet, WiFi, Bluetooth, RFID, or other transmission medium. The vehicle may employ any of the example drivetrain layouts shown in FIGS. 1-8 or may employ yet an alternative drivetrain layout. In S1002, the service brake may be applied by a processor of the vehicle, by the user, or both. Alternatively, or in addition, a hill start assist may be activated. A hill start assist may apply the service brake automatically to prevent the vehicle from rolling when starting from rest on an incline. In S1003, the vehicle may wait for the selection of a driving gear. The selected gear may be, for example, a "Drive" gear and may be selected by the user or selected automatically by a processor of the vehicle. In response to the gear selection, a processor of the vehicle may cause the disengagement of the at least two concurrent driving stages and to engage a single driving stage of the multi-speed gearbox 8 in S1004. The disengagement of the at least two driving stages may occur after rotation of the input shaft of at least the first and/or second multi-speed gearbox 8 in order to correctly align the hub of the driving stage (e.g., $i(1)/i(2)$) with the sliding clutch 4. Rotation of the input shaft of the multi-speed gearbox(es) 8 may involve displacing the vehicle forward and/or reverse by a relatively small distance, such as between 5 and 25 mm; preferably, 14 mm or less. In S1005, the vehicle service brake may be released in response to receiving an accelerator request. The accelerator request may be transmitted by a processor of the vehicle in response to the user depressing an accelerator pedal, for example.

Figure 11:
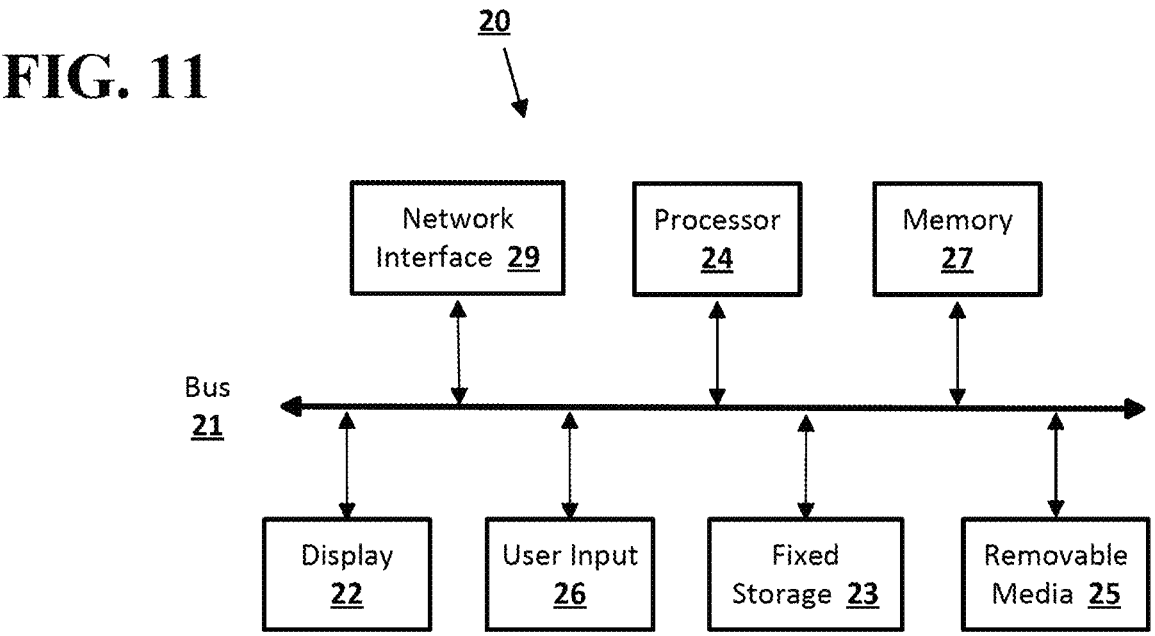
FIG. 11 shows a computing device 20 according to an embodiment of the disclosed subject matter.

Embodiments of the processor-based features of the presently disclosed subject matter may be implemented in and used with a variety of component and network architectures. FIG. 11 is an example computing device 20 suitable for implementing embodiments of the presently disclosed subject matter. The device 20 may be, for example, a desktop or laptop computer, gaming console, gaming server, set-top box, or a mobile computing device such as a smart phone, tablet, or the like. The device 20 may include a bus 21 which interconnects major components of the computing device 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computer-readable storage media such as one or more of the memory 27, fixed storage 23, removable media 25, or on a remote storage location.

Figure 12:
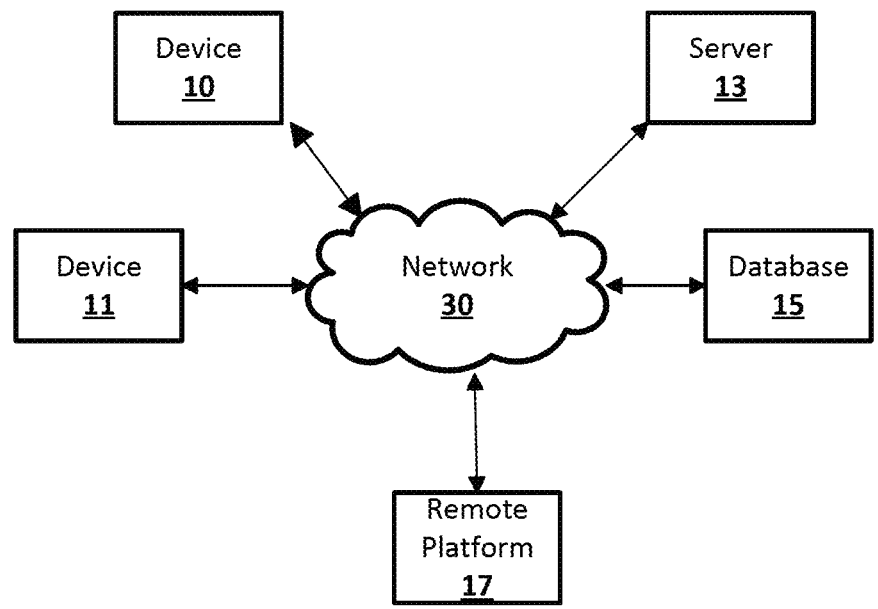
FIG. 12 shows a network configuration according to an embodiment of the disclosed subject matter.

FIG. 12 shows an example network arrangement according to an embodiment of the disclosed subject matter. One or more devices 10, 11, such as local computers, smart phones, tablet computing devices, and the like may connect to other devices via one or more networks 30. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

The user interface 13, database 15, and/or processing units 14 may be part of an integral system or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13.

Figure 13:
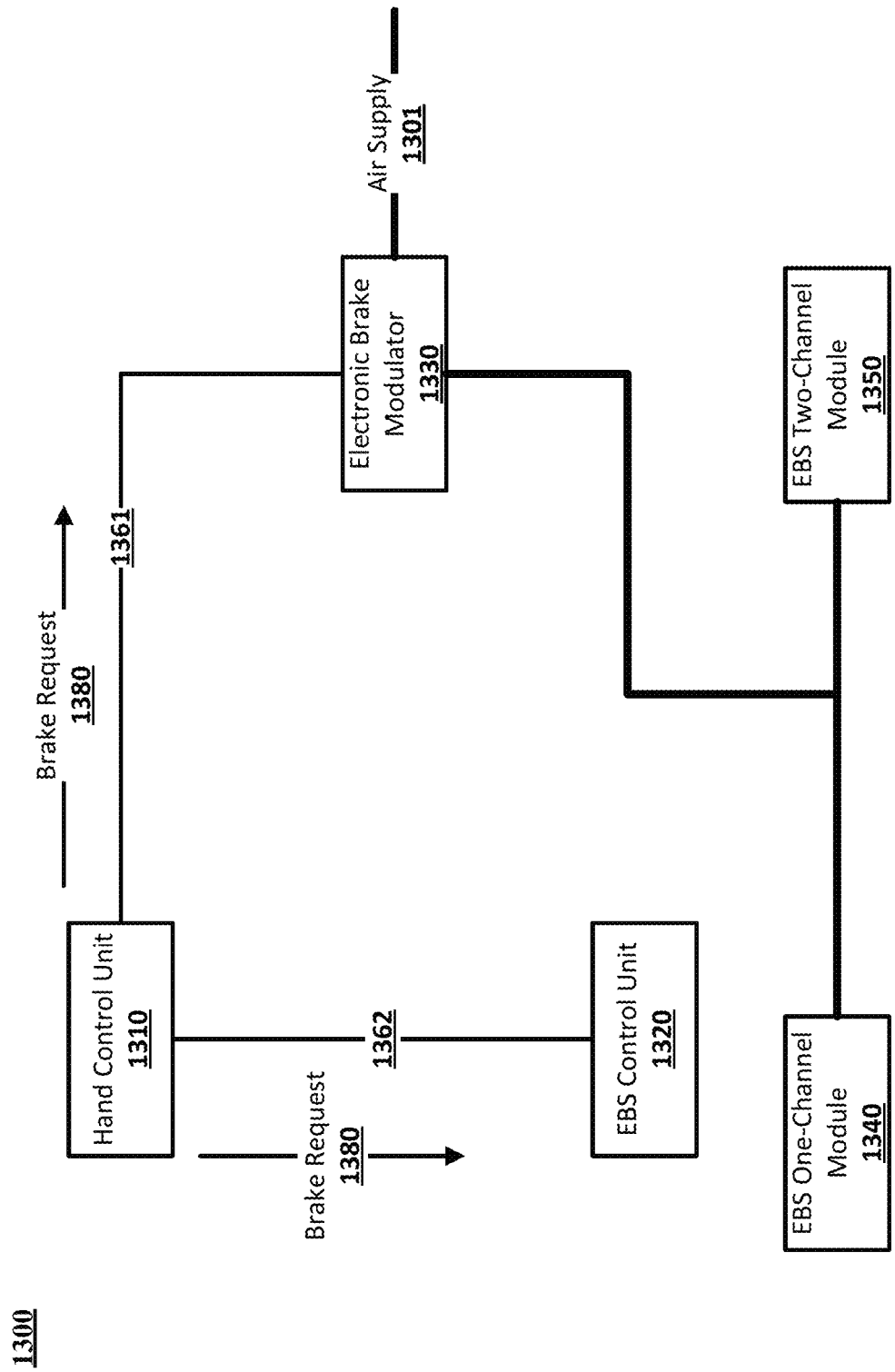
FIG. 13 illustrates an example partial system configuration for enabling the secondary brake functionality in accordance with an embodiment of the disclosed subject matter.

FIG. 13 illustrates an example partial system configuration 1300 for enabling the secondary brake functionality in case of a service brake control failure when dynamic parking brake functionality is not available. This parking lock does not allow for braking when the vehicle is in motion, unlike present spring brake type parking brakes. Alternatively, secondary braking via hand control unit can be realized. A hand control unit 1310 may be electrically coupled to an electronic brake modulator 1330 and electronic braking system (EBS) control unit 1320. Alternatively, or in addition, the features of the EBS control unit 1320 may be implemented using other types of computing devices capable of being configured to apply the vehicle service brake. For example, the features of EBS control unit 1320 may be performed by a general-purpose processor or controller configured to execute instructions stored in a computer-readable storage medium to transform the general-purpose processor into a special-purpose processing device. The EBS control unit 1320 may implemented using, for example, a microprocessor, microcontroller, field-programmable gate array (FPGA), application-specific integrated circuit (ASIC), and/or a software module that executes on a centralized controller that performs other functions and/or cooperates with other vehicle systems. In case of a foot brake module failure, the driver can activate the service brake via the hand control unit 1310. The hand control unit 1310 sends the brake request 1380 to the EBS control unit 1320 via an electronic signal. In case of EBS failure, the hand control unit 1310 sends a brake request 1380 to the EBM 1330. EBM 1330 is the pneumatic backup that supplies EBS one-channel module 1340 and EBS two-channel module 1350 in case of EBS failure. Foot Brake Module failures can occur, for example, when a bottle is under the pedal and the driver cannot execute the brake request with his foot. In an embodiment, the electrical coupling may be via communications paths 1361/1362, such as a Controller Area Network (CAN). Communications path 1361/1362 may be implemented via two separate and individual point-to-point connections as shown in FIG. 13 or via a common bus configuration comprising path 1361 and path 1362. The electronic brake modulator 1330 may be connected with a pneumatic air supply 1301 and configured to distribute the air supply 1301 to an EBS one-channel module 1350 and EBS two-channel module 1340. Hand control unit 1310 may transmit a brake request 1380 via communication path 1361 to electronic brake modulator 1330 and a brake request 1380 via communication path 1362 to EBS control unit 1320. In response to receiving brake request 1380, electronic brake modulator 1330 may modulate air pressure to the EBS one-channel module 140 and EBS two-channel module 1350.

Figure 14:
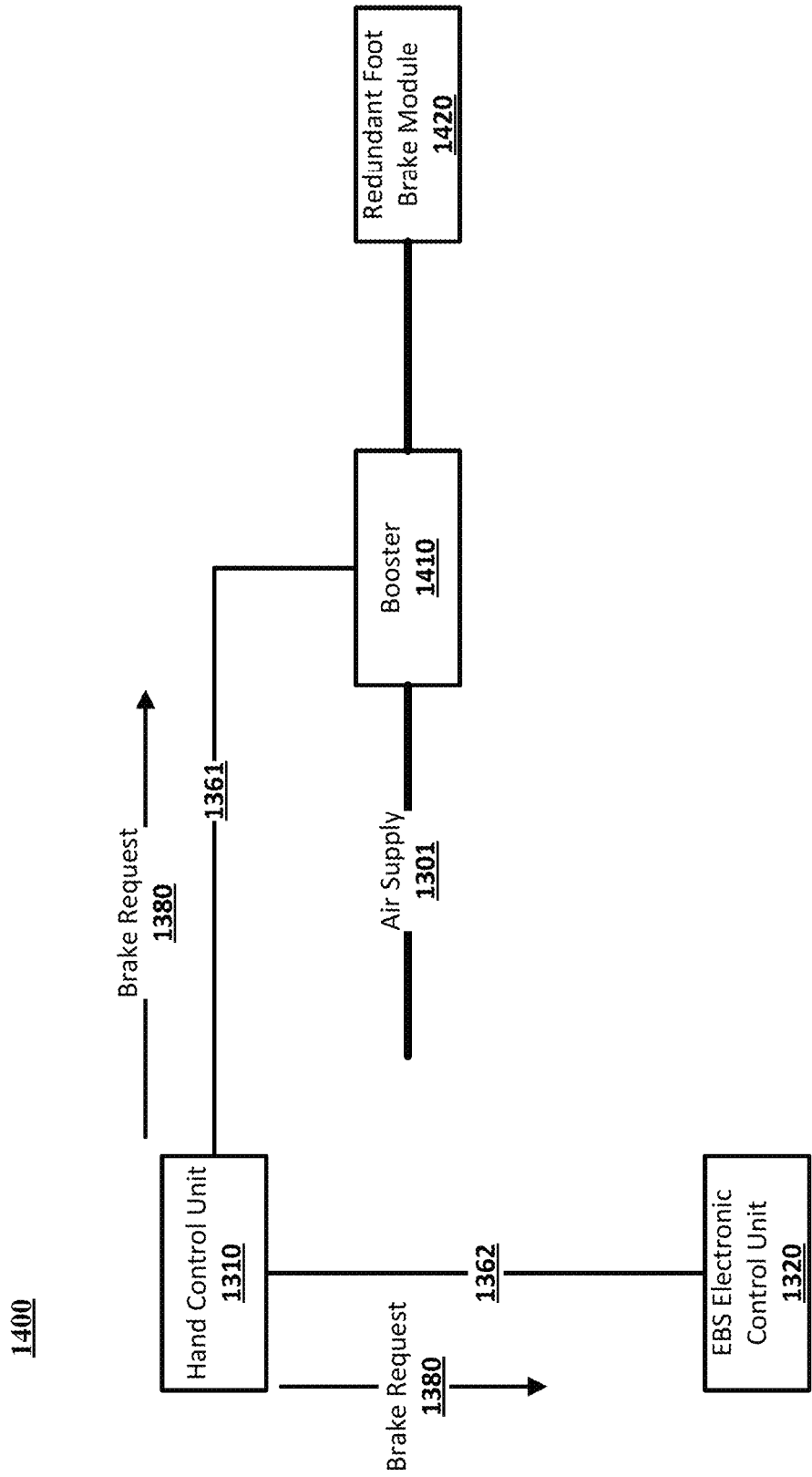
FIG. 14 illustrates an example partial system configuration for enabling the secondary brake functionality in accordance with an embodiment of the disclosed subject matter.

FIG. 14 illustrates an example partial system configuration 1400 for enabling the secondary brake functionality in case of a service brake control failure when dynamic parking brake functionality is not available. A hand control unit 1310 may be electrically coupled to a booster 1410 and electronic braking system (EBS) control unit 1320. In an embodiment, the electrical coupling may be via communications paths 1361/1362, such as a Controller Area Network (CAN). Communications path 1361/1362 may be implemented via two separate and individual point-to-point connections as shown in FIG. 14 or via a common bus configuration comprising path 1361 and path 1362. The booster 1410 may be connected with a pneumatic air supply 1301 and configured to modulate the air supply 1301 to a redundant foot brake module 1420. Hand control unit 1310 may transmit a brake request 1380 via communication path 1362 to EBS control unit 1320. If the brake request 1380 is not executed, then the brake request 1380 is transmitted via communication path 1361 to the booster 1410. In response to receiving pressure request 1380, the booster 1410 may modulate air pressure to the redundant foot brake module 1420. A service brake may be activated by the hand control unit 1310 by sending a brake request 1380 to the redundant foot brake module 1420 via booster 1410 when the EBS control unit 1320 fails in executing the brake request 1380.

More generally, various processor-enabled features of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

LISTING OF REFERENCE LABELS 1 electric motor
2 electric motor
3/3A-3D gear actuator
4/4A/4B clutch
5 differential
6 differential lock
7 wheels
8/8A/8B multi-speed gearbox
9 auxiliary device
10 device
11 device
12/12A/12B shaft lock
13 server
15 database
17 remote platform
20 computing device
21 bus
22 display
23 fixed storage
24 processor
25 removable media
26 user input
27 memory
29 network interface
30 network
100 drivetrain layout
150 drivetrain layout
200 drivetrain layout
250 drivetrain layout
275 drivetrain layout
300 drivetrain layout
400 drivetrain layout
500 drivetrain layout
600 drivetrain layout
700 drivetrain layout
800 drivetrain layout
825 drivetrain layout
850 drivetrain layout
875 drivetrain layout
900 flow
1000 flow
1300 system configuration
1301 air supply
1310 hand control device
1320 electronic braking system control unit
1330 electronic brake modulator
1340 electronic braking system one-channel module
1350 electronic braking system two-channel module
1361 communication path
1362 communication path
1380 brake request
1400 system configuration
1410 brake booster
1420 redundant foot brake module

The invention claimed is:

1. A commercial vehicle comprising:
at least one driven axle,
at least one service brake,
at least one propulsion engine,
a pair of wheels, wherein
 a parking brake function of the vehicle is solved by a bistable locking means acting on both wheels, and
 the bistable locking means comprises:
  a first multi-speed gearbox having a first gear stage activated by a first actuator and coupled to a first wheel of the pair of wheels,
  a second multi-speed gearbox having a second gear stage activated by a second actuator and coupled to a second wheel of the pair of wheels, wherein the parking brake function is achieved at least in-part by concurrently activating the first gear stage and the second gear stage; and
  an output shaft lock, when activated, to couple the first wheel of the pair of wheels to the second wheel of the pair of wheels;
a computing device configured to activate the bistable locking means when the commercial vehicle is at a standstill, and
an electronic brake control unit, wherein
 when the vehicle is in motion, the computing device is configured to send a brake request via an electronic signal to the electronic brake control unit to activate the at least one service brake.

2. The commercial vehicle of claim 1, wherein the first gear stage is characterized by a first ratio that differs from a second ratio of the second gear stage.

3. The commercial vehicle of claim 1, further comprising:
an outer planetary gear disposed in an outer wheel rim of each wheel of the wheels of the driven axle, wherein a ratio between a final stage shaft of a differential driving the pair of wheels and the driven wheel is greater than one.

4. The commercial vehicle of claim 1, further comprising:
a redundant foot brake module for redundant braking; and a booster, wherein
the computing device is configured to send a brake request to the booster via an electronic signal to activate the redundant foot brake module when the electronic brake control unit fails to execute the brake request.

5. A commercial vehicle comprising:
at least one driven axle;
at least one service brake;
at least one propulsion engine;
a pair of wheels, wherein
a parking brake function of the vehicle is solved by a bistable locking means acting on both wheels, and
the bistable locking means comprises:
a first multi-speed gearbox having a first gear stage activated by a first actuator and coupled to a first wheel of the pair of wheels;
a second multi-speed gearbox having a second gear stage activated by a second actuator and coupled to a second wheel of the pair of wheels, wherein the parking brake function is achieved at least in-part by concurrently activating the first gear stage and the second gear stage; and
an input shaft lock, when activated, to couple an input of the first multi-speed gearbox with an input of the second multi-speed gearbox;
a computing device configured to activate the bistable locking means when the commercial vehicle is at a standstill; and
an electronic brake control unit, wherein
when the vehicle is in motion, the computing device is configured to send a brake request via an electronic signal to the electronic brake control unit to activate the at least one service brake.

6. The commercial vehicle of claim 5, wherein
the first gear stage is characterized by a first ratio that differs from a second ratio of the second gear stage.

7. The commercial vehicle of claim 5, further comprising:
an outer planetary gear disposed in an outer wheel rim of each wheel of the wheels of the driven axle, wherein
a ratio between a final stage shaft of a differential driving the pair of wheels and the driven wheel is greater than one.

8. The commercial vehicle of claim 5, further comprising:
a redundant foot brake module for redundant braking; and
a booster, wherein
the computing device is configured to send a brake request to the booster via an electronic signal to activate the redundant foot brake module when the electronic brake control unit fails to execute the brake request.

9. A commercial vehicle comprising:
at least one driven axle;
at least one service brake;
at least one propulsion engine;
a pair of wheels, wherein
a parking brake function of the vehicle is solved by a bistable locking means acting on both wheels, and
the bistable locking means comprises:
a first multi-speed gearbox having a first gear stage activated by a first actuator and coupled to a first wheel of the pair of wheels;
a second multi-speed gearbox having a second gear stage activated by a second actuator and coupled to a second wheel of the pair of wheels, wherein the parking brake function is achieved at least in-part by concurrently activating the first gear stage and the second gear stage;
an elastic coupling; and
a sliding clutch comprising:
a toothed selector ring coupled to the elastic coupling that allows for limited rotational movement of the toothed selector ring about a sliding axis of the sliding clutch, wherein
the sliding clutch is actuated by the second actuator.

10. The commercial vehicle of claim 9, wherein
the first gear stage or second gear stage comprises conjugated teeth; and
the teeth of the toothed selector ring are shaped to allow meshing with the conjugated teeth when in a tooth-to-tooth position.

11. The commercial vehicle of claim 9, further comprising:
an outer planetary gear disposed in an outer wheel rim of each wheel of the wheels of the driven axle, wherein
a ratio between a final stage shaft of a differential driving the pair of wheels and the driven wheel is greater than one.

12. The commercial vehicle of claim 9, further comprising:
a computing device to activate the bistable locking means when the commercial vehicle is at a standstill.

13. The commercial vehicle of claim 12, further comprising:
an electronic brake control unit, wherein
when the vehicle is in motion, the computing device is configured to send a brake request via an electronic signal to the electronic brake control unit to activate the at least one service brake.

14. The commercial vehicle of claim 13, further comprising:
a redundant foot brake module for redundant braking; and
a booster, wherein
the computing device is configured to send a brake request to the booster via an electronic signal to activate the redundant foot brake module when the electronic brake control unit fails to execute the brake request.

* * * * *